United States Patent
Chang

(10) Patent No.: US 9,921,719 B2
(45) Date of Patent: Mar. 20, 2018

(54) TOUCH DISPLAY APPARATUS AND WALLPAPER REPLACING METHOD THEREOF

(71) Applicant: Getac Technology Corporation, Hsinchu County (TW)

(72) Inventor: Chin-Jung Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 249 days.

(21) Appl. No.: 14/929,836

(22) Filed: Nov. 2, 2015

(65) Prior Publication Data
US 2017/0123603 A1    May 4, 2017

(51) Int. Cl.
*G06F 3/0481* (2013.01)
*G06F 3/0482* (2013.01)
*G06F 3/0488* (2013.01)

(52) U.S. Cl.
CPC .......... *G06F 3/0482* (2013.01); *G06F 3/0488* (2013.01); *G06F 3/04817* (2013.01)

(58) Field of Classification Search
CPC ........ G06F 3/041; G06F 3/048; G06F 3/0481; G06F 3/0482; G06F 3/0488; G06F 3/04817
See application file for complete search history.

(56) References Cited

U.S. PATENT DOCUMENTS

| | | | |
|---|---|---|---|
| 9,223,785 B2 * | 12/2015 | Kim ................ | G06F 17/30056 |
| 2014/0115488 A1 * | 4/2014 | Hackborn ......... | H04M 1/72544 715/741 |
| 2014/0123013 A1 * | 5/2014 | Lee ........................ | G06F 3/0481 715/719 |
| 2015/0033160 A1 * | 1/2015 | Xie ........................ | G06F 3/0482 715/765 |
| 2015/0205498 A1 * | 7/2015 | Levi .................... | G06F 3/04842 715/763 |

* cited by examiner

*Primary Examiner* — Xiomar L Bautista
(74) *Attorney, Agent, or Firm* — Locke Lord LLP; Tim Tingkang Xia, Esq.

(57) ABSTRACT

A touch display apparatus and a wallpaper replacing method thereof are provided to select from wallpapers the one different from a currently displayed wallpaper according to a page-replacing operation when touch display apparatus is in an unlocked state, so as to replace the currently displayed wallpaper.

10 Claims, 4 Drawing Sheets

TOUCH DISPLAY APPARATUS AND WALLPAPER REPLACING METHOD THEREOF

BACKGROUND OF THE INVENTION

Field of the Invention

The present invention relates to display apparatuses and more particularly to a touch display apparatus and a wallpaper replacing method thereof.

Description of the Prior Art

Due to technological advancement, not only is importance increasingly attached to low weight, small size and esthetic appeal of electronic apparatuses, but there are increasingly strict requirements for dynamic variable design of operation interfaces and intuitive use thereof. Take a smartphone as an example, it allows users to configure how its operation interface looks like, select its wallpaper, and lay its application icons. The users assort and lay the application icons according to the functions of applications or colors of icons, such that the users can determine the optimal or most attractive layout of the application icons according to user preferences.

SUMMARY OF THE INVENTION

The present invention provides a touch display apparatus and a wallpaper replacing method thereof to enhance the ease of use of the touch display apparatus.

The touch display apparatus of the present invention comprises a storing unit, a touch display unit and a processing unit. The storing unit stores multiple wallpapers. The touch display unit displays an operation interface and senses a page-replacing operation, wherein the operation interface corresponds to a currently displayed wallpaper. The processing unit is coupled to a storing unit and a touch display unit, and the processing unit selects from the multiple wallpapers the one different from the currently displayed wallpaper according to a page-replacing operation when the touch display apparatus is in an unlocked state, so as to replace the currently displayed wallpaper.

In an embodiment of the present invention, the processing unit randomly selects one of the multiple wallpapers according to a page-replacing operation so as to replace the currently displayed wallpaper.

In an embodiment of the present invention, when the touch display unit is in an unlocked state, the operation interface comprises at least one application icon, and the processing unit replaces the currently displayed wallpaper according to an attribute of the selected application icon.

In an embodiment of the present invention, the attributes of the application icon comprises metadata corresponding to an application correlated to the application icon.

In an embodiment of the present invention, the processing unit further configures the wallpapers associated with the at least one application icon according to a configuration command.

In an embodiment of the present invention, the processing unit further configures the wallpapers corresponding to the current page-replacing operation according to a configuration command.

According to the present invention, the wallpaper replacing method for the touch display apparatus comprises the steps of: determining whether the touch display apparatus is in an unlocked state; detecting for a page-replacing operation when the determination is affirmative, wherein the touch display apparatus displays a currently displayed wallpaper; and selecting from the multiple wallpapers the one different from the currently displayed wallpaper according to a page-replacing operation, so as to replace the currently displayed wallpaper.

In an embodiment of the present invention, the wallpaper replacing method for the touch display apparatus further comprises the step of randomly selecting one of the multiple wallpapers according to a page-replacing operation, so as to replace the currently displayed wallpaper.

In an embodiment of the present invention, when the touch display unit is in an unlocked state, the operation interface comprises at least one application icon, and the wallpaper replacing method comprises the step of replacing the wallpaper currently displayed on the touch display unit according to the attribute of the at least one application icon.

In an embodiment of the present invention, the attribute of the application icon comprises metadata corresponding to an application correlated to the at least one application icon.

In an embodiment of the present invention, the wallpaper replacing method further comprises the step of configuring the wallpapers associated with the at least one application icon according to a configuration command.

In an embodiment of the present invention, the wallpaper replacing method further comprises the step of configuring the wallpapers corresponding to the current page-replacing operation according to a configuration command.

Therefore, in an embodiment of the present invention, when the touch display apparatus is in an unlocked state, users select from multiple wallpapers the one different from a currently displayed wallpaper according to a page-replacing operation, so as to replace the currently displayed wallpaper, such that the users gain access to the page number of the current operation interface easily according to the wallpapers to not only enhance the ease of use of the touch display apparatus but also render the operation interface highly variable.

BRIEF DESCRIPTION OF THE DRAWINGS

To render the features and advantages of the present invention obvious and comprehensible, the present invention is hereunder illustrated with specific embodiments in conjunction with the accompanying drawings, in which.

DETAILED DESCRIPTION OF THE EMBODIMENTS

Figure 1:
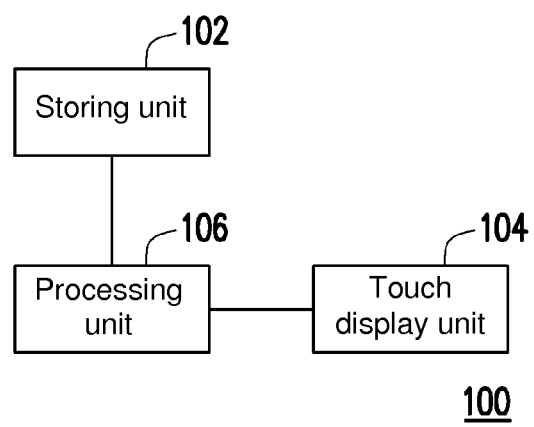
FIG. 1 is a schematic view of a touch display apparatus according to an embodiment of the present invention.

FIG. 1 is a schematic view of a touch display apparatus according to an embodiment of the present invention. Referring to FIG. 1, a touch display apparatus 100 comprises a storing unit 102, a touch display unit 104 and a processing unit 106. The processing unit 106 is coupled to the storing unit 102 and the touch display unit 104. The storing unit 102 stores multiple wallpapers. The touch display unit 104 displays an operation interface and performs touch sensing. When the touch display unit 104 is in an unlocked state, the processing unit 106 selects from the wallpapers stored in the storing unit 102 the one different from a currently displayed wallpaper according to a page-replacing operation, so as to replace the currently displayed wallpaper.

Figure 2A:
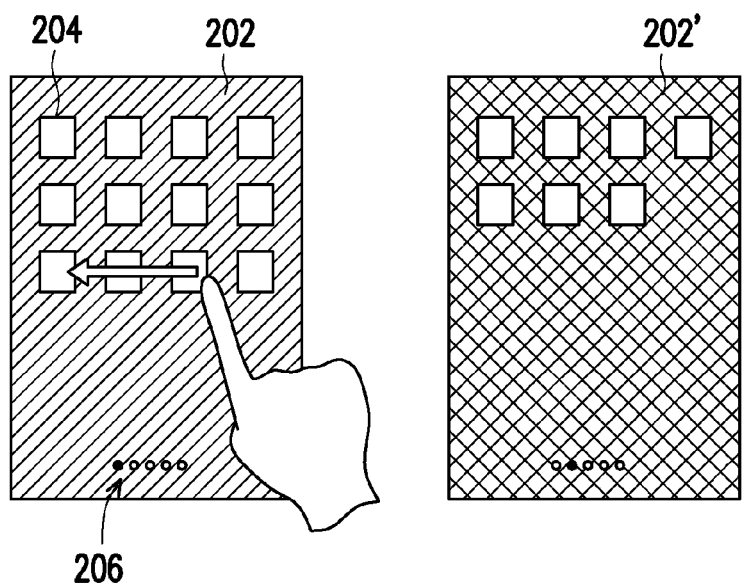
FIG. 2A is a schematic view of a wallpaper to be replaced according to an embodiment of the present invention.

FIG. 2A is a schematic view of a wallpaper to be replaced according to an embodiment of the present invention. Referring to FIG. 2A, in this embodiment, the operation interface comprises a wallpaper 202, at least one application icon 204 (although multiple application icons 204 are provided in this embodiment, they are not restrictive of the quantity of applications) and a page number display icon 206. The page number display icon 206 indicates the number of pages which contain at least one application icon 204 and the current page number. Referring to the left diagram of FIG. 2A, five dots indicate a page with five application icons 204, whereas solid dots indicate the current page numbers. For example, the first dot shown in the left diagram of FIG. 2A is a solid dot and indicates that the page currently displayed by the touch display unit 104 is the first page. The touch display unit 104 senses a page-replacing operation. A page-replacing operation involves performing a drag touch (with a finger which functions as an input tool in this embodiment, but the present invention is not limited thereto and therefore may employ the other input tools, such as a stylus, in performing the touch operation) from the right to the left as shown in FIG. 2A. As soon as the touch display unit 104 senses a page-replacing operation, the operation interface displayed on the touch display unit 104 turns to another page, while the wallpaper attributed to the operation interface and corresponding to a specific page is also replaced. Therefore, the present invention is characterized in that: as soon as the touch display unit 104 detects a page-replacing operation, the first page initially displayed on the page number display icon 206 is changed to the second page as shown in the right diagram of FIG. 2A, whereas the wallpaper 202 initially corresponding to the first page is also replaced with a wallpaper 202' corresponding to the second page.

Since a page-replacing operation does not necessarily entail performing a drag touch from the right to the left, it is practicable that in another embodiment a page-replacing operation involves performing a drag touch in the other ways, for example, from the left to the right, or clicking consecutively. The processing unit 106 configures a wallpaper corresponding to a page-replacing operation with a configuration command, and the wallpaper 202' for use in replacement is, for example, randomly selected from multiple wallpapers stored in the storing unit 102, though the present invention is not limited thereto. In yet another embodiment, the wallpaper currently displayed on the touch display unit is replaced according to an attribute of the selected application icon 204, wherein the attribute of the application icon 204 comprises metadata corresponding to an application correlated to the application icon 204, such as the color of the application icon, the position of the application icon on the operation interface, and the type of the application icon, etc. The processing unit 106 configures a wallpaper associated with the application icon 204 according to a configuration command, such that multiple application icons 204 may correspond to the same wallpaper.

Figure 2B:
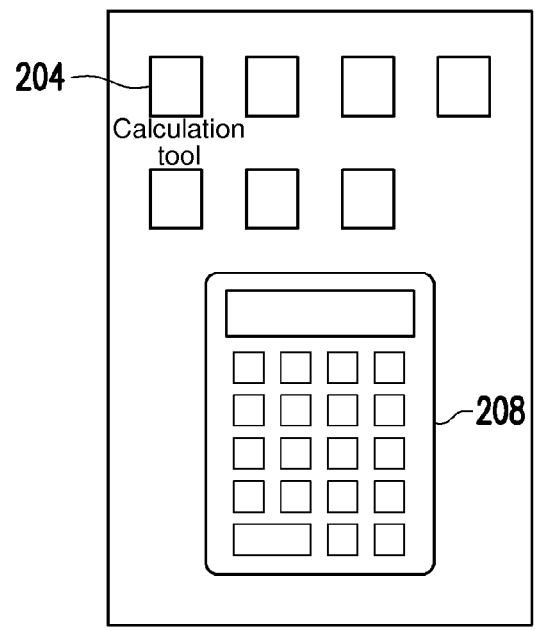
FIG. 2B~FIG. 2E are schematic views of the wallpaper replaced according to an embodiment of the present invention.
Figure 2C:
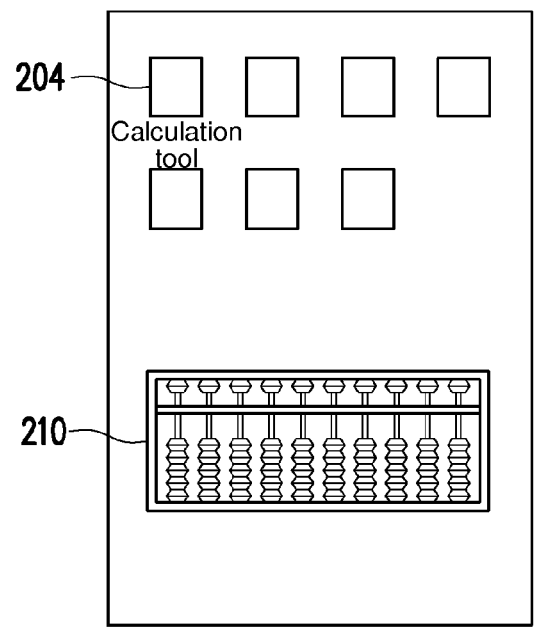

One of the technical features of the present invention is in that, the processing unit 106 replaces the wallpaper 202 of each page with a configuration command according to the attribute of the application icon 204 corresponding to the first column and the first row of each page. For example, the wallpaper 202 is replaced according to the color or type of the application icon 204. For example, if the color of the application icon 204 is warm as selected by a user, the wallpaper 202 can be accordingly replaced with a wallpaper of a warm color. Similarly, if the type of the application icon 204 is a calculation tool as selected by the user, the wallpaper 202 can be accordingly replaced with a wallpaper which shows a calculator or an abacus. Therefore, referring to FIG. 2B and FIG. 2C, the user directly determines the attribute of application contained in the current page according to a calculator icon 208 or an abacus icon 210 shown in the wallpaper after replacement.

Figure 2D:
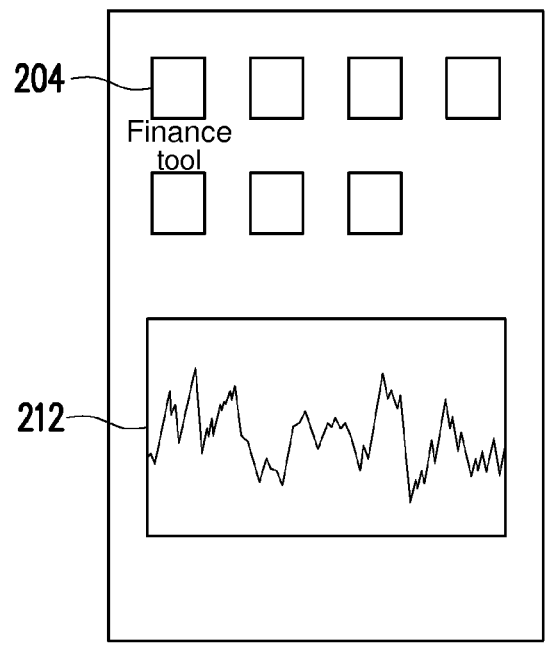
Figure 2E:
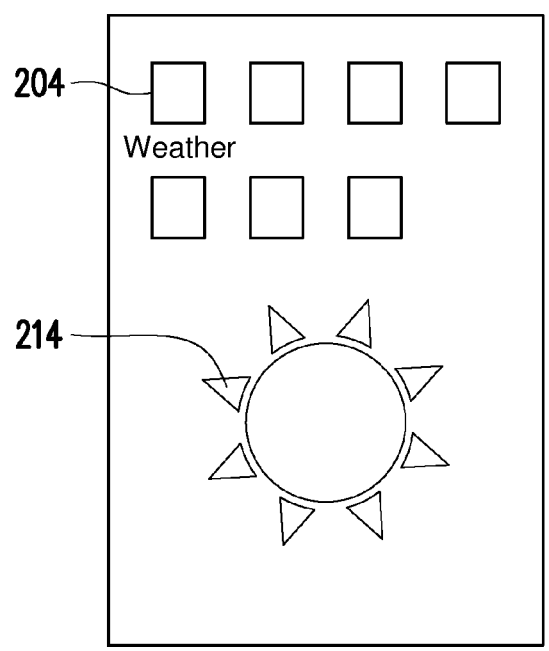

Referring to FIG. 2D, in another embodiment, a picture which contains related information is selected to be a wallpaper for use in replacement. For example, if the type of the application icon 204 is a finance tool, the wallpaper 202 can be accordingly replaced with a wallpaper which shows the technical analysis chart of a stock traded on a stock market. Furthermore, the data of the technical analysis chart shown on this wallpaper, such as spot price, 5-day moving average, 30-day moving average, and spot trading volume, is updated synchronously. Therefore, the user not only determines the attributes of the applications included in the current page according to a wallpaper, but also directly accesses related information from the wallpaper, thereby greatly enhancing the ease of use of the touch display apparatus 100. Referring to FIG. 2E, in yet another embodiment, if the type of the application icon 204 is weather, it will be practicable to replace the wallpaper with an icon corresponding to today's weather forecast. If today's weather forecast is sunny, the wallpaper will be replaced with a wallpaper which contains a sun icon 214. If today's weather forecast is cloudy, the wallpaper will be replaced with a wallpaper which contains a thick-cloud icon.

Figure 3:
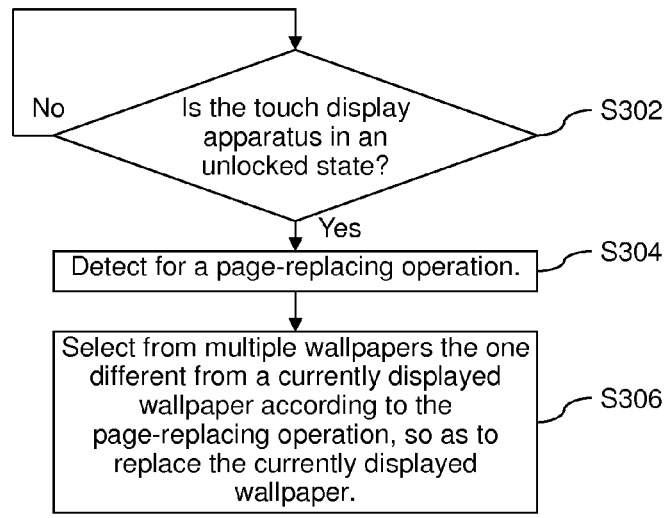
FIG. 3 is a flowchart of a wallpaper replacing method for the touch display apparatus according to an embodiment of the present invention.

FIG. 3 is a flowchart of a wallpaper replacing method for the touch display apparatus according to an embodiment of the present invention. The method comprises the steps of: determining whether the touch display apparatus is in an unlocked state (step S302); detecting for a page-replacing operation if the touch display apparatus is in an unlocked state, wherein the touch display apparatus displays a wallpaper corresponding to the application icon of the current page (step S304); selecting from multiple wallpapers the one different from a currently displayed wallpaper according to the page-replacing operation, so as to replace the currently displayed wallpaper (step S306). Furthermore, if the touch display apparatus is not in an unlocked state, it will be necessary to keep determining whether the touch display apparatus is in an unlocked state.

In step S306, the ways of replacing a wallpaper include, for example, randomly selecting a wallpaper from multiple stored wallpapers according to a page-replacing operation, so as to replace the wallpaper currently displayed on the touch display unit. Alternatively, it is feasible to replace the wallpaper currently displayed on the touch display unit according to an attribute of the application icon, wherein the attribute of the application icon comprises metadata corresponding to an application correlated to the application icon.

Figure 4:
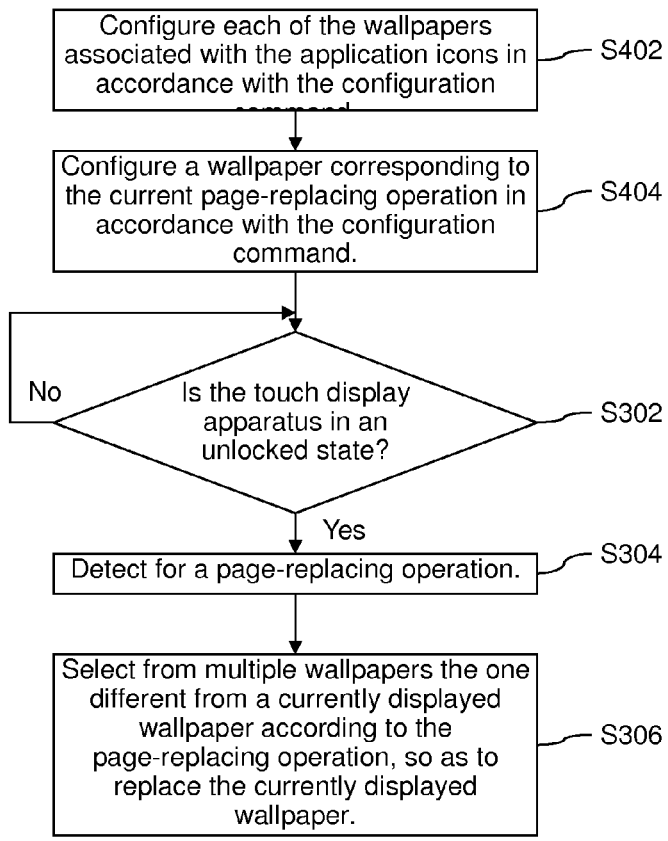
FIG. 4 is a flowchart of the wallpaper replacing method for the touch display apparatus according to another embodiment of the present invention.

FIG. 4 is a flowchart of the wallpaper replacing method for the touch display apparatus according to another embodiment of the present invention. The embodiment illustrated with FIG. 4 is different from the embodiment illustrated with FIG. 3 in that, in the embodiment illustrated with FIG. 4, the user configures the wallpapers to be replaced, using a configuration command. Referring to FIG. 4, the wallpaper replacing method for the touch display apparatus further comprises step S402 and step S404. Step S402 involves configuring each of the wallpapers corresponding to the application icons in accordance with the configuration command. Then, step S404 involves configuring a wallpaper corresponding to the current page-replacing operation in accordance with the configuration command. Afterward, the process flow of the wallpaper replacing method proceeds to step S302 to follow the subsequent steps of the wallpaper replacing method, which are already illustrated with the embodiment of FIG. 3 and therefore are not reiterated herein.

In conclusion, in an embodiment of the present invention, when a touch display apparatus is in an unlocked state, users select from multiple wallpapers the one different from a currently displayed wallpaper according to a page-replacing operation so as to replace the currently displayed wallpaper, such that the users gain access to the page number of the current operation interface easily according to the wallpapers to not only enhance the ease of use of the touch display apparatus but also render the operation interface highly variable. In another embodiment, a wallpaper for use in replacement contains related information, such that the users not only determine the attributes of the application included in the current page according to the wallpaper but also gain direct access to related information contained in the wallpapers, thereby greatly enhancing the ease of use of the touch display apparatus.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A touch display apparatus, comprising:
    a storing unit for storing multiple wallpapers;
    a touch display unit for displaying an operation interface and sensing a page-replacing operation, wherein the operation interface corresponds to a currently displayed wallpaper, wherein the operation interface comprises at least one application icon; and
    a processing unit coupled to the storing unit and the touch display unit, and the processing unit selects one from the wallpapers different from the currently displayed wallpaper according to the page-replacing operation when the touch display apparatus is in an unlocked state, so as to replace the currently displayed wallpaper according to an attribute of a selected one of the at least one application icon,
    wherein the attribute is one selected from the group consisting of a color, a position, and a type of the selected one application icon; and
    wherein the processing unit associates one of the wallpapers with one of the at least one application icon such that multiple application icons correspond to a same wallpaper.

2. The touch display apparatus of claim 1, wherein the processing unit randomly selects one of the wallpapers according to the page-replacing operation so as to replace the wallpaper currently displayed on the touch display unit.

3. The touch display apparatus of claim 1, wherein the attribute of the selected application icon comprises metadata corresponding to an application correlated to the at least one application icon.

4. The touch display apparatus of claim 1, wherein the processing unit further configures the wallpapers associated with the at least one application icon according to a configuration command.

5. The touch display apparatus of claim 1, wherein the processing unit further configures the wallpapers corresponding to the page-replacing operation according to a configuration command.

6. A wallpaper replacing method for a touch display apparatus, comprising the steps of:
    determining whether the touch display apparatus is in an unlocked state;
    detecting for a page-replacing operation when the determination is the unlocked state, wherein the touch display apparatus displays a currently displayed wallpaper wherein the operation interface comprises at least one application icon; and
    selecting one from the wallpapers different from the currently displayed wallpaper according to the page-replacing operation, so as to replace the currently displayed wallpaper according to an attribute of a selected one of the at least one application icon,
    wherein the attribute is one selected from the group consisting of a color, a position, and a type of the selected one application icon; and
    wherein the processing unit associates one of the wallpapers with one of the at least one application icon such that multiple application icons correspond to a same wallpaper.

7. The wallpaper replacing method of claim 6, further comprising randomly selecting one of the wallpapers according to the page-replacing operation to replace the wallpaper currently displayed on the touch display unit.

8. The wallpaper replacing method of claim 6, wherein the attribute of the selected application icon comprises metadata corresponding to an application correlated to the at least one application icon.

9. The wallpaper replacing method of claim 6, further comprising:
    configuring the wallpapers associated with the at least one application icon according to a configuration command.

10. The wallpaper replacing method of claim 6, further comprising:
    configuring the wallpapers corresponding to the current page-replacing operation according to a configuration command.

* * * * *